April 12, 1949. W. E. HABIG 2,467,306
FLAW DETECTOR FOR TUBING AND THE LIKE
Filed Sept. 8, 1943 4 Sheets-Sheet 1

INVENTOR.
WILLIAM E. HABIG
BY
Joseph H. Lipschutz
ATTORNEY

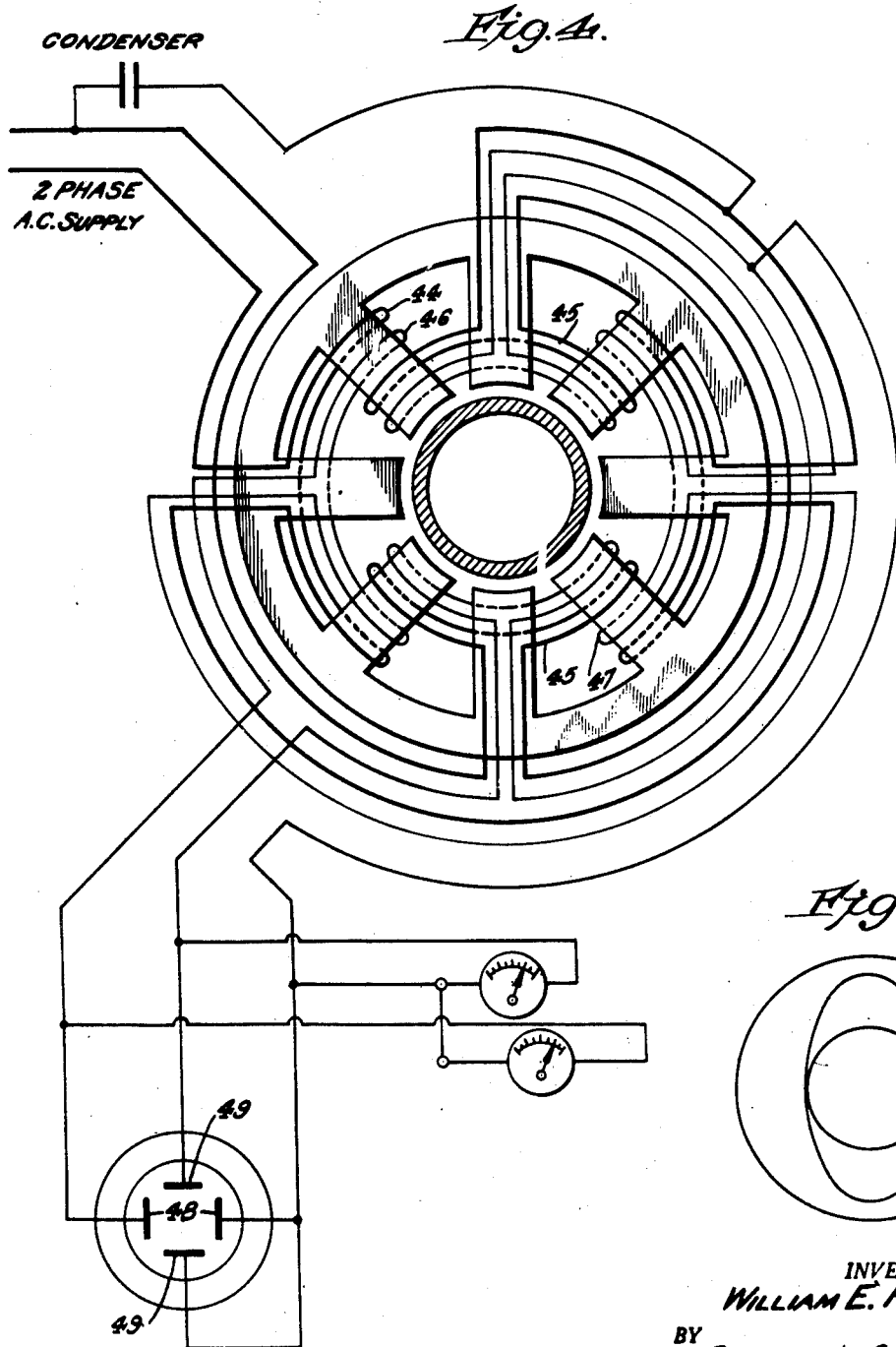

April 12, 1949.  W. E. HABIG  2,467,306
FLAW DETECTOR FOR TUBING AND THE LIKE
Filed Sept. 8, 1943  4 Sheets-Sheet 4

INVENTOR.
WILLIAM E. HABIG
BY
*Joseph H. Lipschutz*
ATTORNEY

Patented Apr. 12, 1949

2,467,306

UNITED STATES PATENT OFFICE 2,467,306

FLAW DETECTOR FOR TUBING AND THE LIKE

William E. Habig, Green Village, N. J., assignor to Sperry Products, Inc., Hoboken, N. J., a corporation of New York Application September 8, 1943, Serial No. 501,511

12 Claims. (Cl. 175—183)

This invention relates to a method of, and means for, testing metallic bar stock, non-magnetic tubing and the like for flaws. These flaws may take the form of cracks in the surface extending either lengthwise or transversely or both, or they may be hidden fissures which do not make their appearance on the surface. The methods of testing heretofore employed consist in generating a current within the conductor in a given direction, and relying upon the fissure to offer increased resistance to the flow of current. This involves the necessity of generating a current within the tubing whose direction is substantially at right angles to the direction of the fissure. Thus, for instance, if it is desired to detect longitudinal fissures, devices now employed have means for generating current flow in a circumferential direction, so that the fissure will offer the maximum resistance to the current flow. This creates the situation, however, where only one type of fissure can be detected, namely, the type which is positioned in a direction substantially normal to the direction of current flow. If, in addition, it is desired to detect fissures in another direction, it is necessary to generate a second current flow within the conductor in a direction substantially normal to the direction of the second type of fissure to be detected.

It is the principal object of the present invention to provide a method of, and means for, testing bar stock, non-magnetic tubing and similar conductors wherein with but a single source of electrical energization of the conductor under test, it will be possible to detect fissures in every angular relationship with respect to the axis of the material being tested. Thus, with a single source of energy applied to the tubing, I am enabled to detect transverse fissures, longitudinal fissures, and in fact, fissures at any angle with respect to the longitudinal axis of the tubing. For this purpose I employ a type of energization wherein a changing magnetic flux passes diametrically through the tube, thus inducing eddy currents in the wall of the tubing in a plane substantially at right angles to the diameter of the tubing. These eddy currents traverse a circular path, and thus will be interrupted by any fissure regardless of its angular relationship with respect to the longitudinal axis of the tube. In order that the entire surface of the tube may be tested, I provide means for causing the flux to rotate continuously around the longitudinal axis of the tube, thus insuring that the entire wall of the tubing will be equally energized. Variations in the eddy currents thus generated may be detected by any suitable means, preferably a plurality of symmetrically positioned induction coils which are linked in mutual inductive relationship with the source of energy and with the tube.

Further objects and advantages of this invention will become apparent in the following detailed description thereof.

In the accompanying drawings,

Fig. 4 is a view similar to Fig. 3, but embodying another modification of this invention.

Fig. 5 is a front view of an oscillograph indicator.

Figure 1:
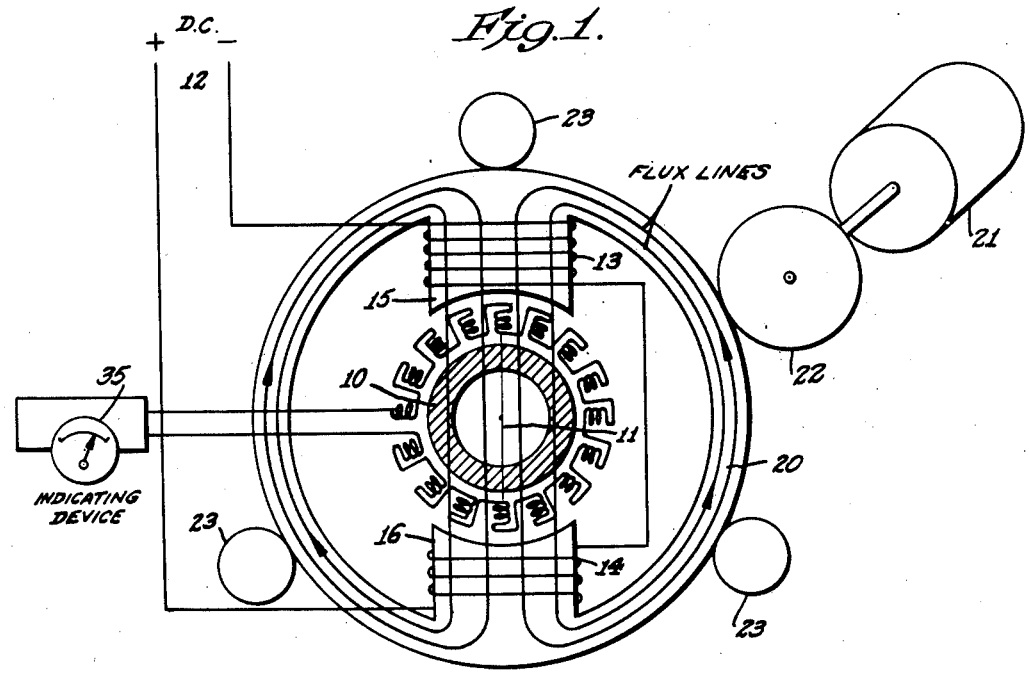
Fig. 1 is an end view largely diagrammatic showing the principles embodied in this invention.

Referring first to Fig. 1, I have shown, largely diagrammatically, the simplest embodiment of my invention. Here is shown an end view of an object to be tested, in this case a non-magnetic tube 10 which is to be tested for all types of fissures—transverse, longitudinal, and any other angular relationship with respect to the longitudinal axis 11 of the tube. The first step of my method consists in energizing the tube 10 with flux from coils 13 and 14 wound around diametrically oppositely-disposed poles 15 and 16 and connected to any suitable source such as the D. C. supply 12. Thus, magnetic flux will pass diametrically through the tube 10 between poles 15 and 16 as a result of the energization of coils 13 and 14. In the next step of my method, the magnetic field and the tube are relatively rotated about the longitudinal axis of the tube and thereby eddy currents are generated in the entire wall of tube 10.

Figure 2:
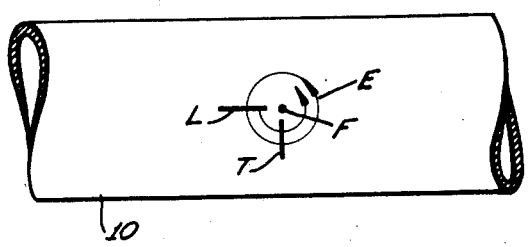
Fig. 2 is a plan view of the tube shown in Fig. 1.

I may accomplish both of these ends by causing the poles 15 and 16, with their energizing coils 13 and 14, to rotate continuously with respect to the tube 10, around the longitudinal axis 11. For this purpose, the poles 15 and 16 may be part of an annular housing 20 geared to a motor 21 by suitable gearing 22 to cause the annular member 20 to rotate within a series of roller supports 23 around the longitudinal axis 11. Thus it will be apparent that the diametric path of magnetic flux between poles 15 and 16 rotates continuously around the longitudinal axis 11, setting up eddy currents in the wall of tube 10. Each portion of the wall of tube 10 is successively subjected to the diametric flux, and in each portion of said wall there is set up successively circular eddy currents as shown in Fig. 2 at E. These eddy currents will be of constant magnitude if the wall of tube 10 is without defect. A plurality of detector coils 30 connected in series aiding relationship are positioned in mutual inductive relationship to the energizing coils 13 and 14 and the tube 10. This mutual inductance is normally affected in a constant manner by the eddy currents set up in the wall of tube 10 in a plane normal to the diametric magnetic path F as shown in the plan view of the tube in Fig. 2. However, if the eddy currents at any point encounter a longitudinal defect L, or a transverse defect T, more resistance will be offered to the flow of such current, and this increased resistance to the flow of eddy current at any given point will vary the mutual inductive linkage between the detector coils 30 on the one hand, and the energizing coils 13 and 14 and the tube 10, on the other hand. Such variation in mutual inductance will affect certain of said detector coils more than the others because certain of said coils will be in the region of said defect while the others are not, and thus, the normal output from said detector coils will be varied. This normal output may be detected in any suitable manner by any suitable indicator, as for instance, the voltmeter 35.

From the above description it will be seen that I have provided the simplest form of my invention wherein flux is passed through the tube to be tested substantially along a diameter thereof, which diameter is made to revolve about the longitudinal axis of the tube, causing the flux to generate eddy currents in the wall of the tube in a plane substantially normal to the path of flux, and indicating variations in these eddy currents.

My invention may take various other forms. Thus, for instance, in Fig. 3, I have shown the energizing coils 40, 41 and 42 as connected to the respective phases of a three-phase A. C. supply. The windings 40, 41 and 42 may be the three stator windings of a three-phase motor, wherein the armature of the motor is replaced by the tube 10 to be tested. As is well known in this construction, the energizing field of magnetic flux passes diametrically through the armature, and the path rotates continuously around the axis 11 of the armature. In this case, the armature is replaced by the tube 10, and the diametric energizing field will rotate continuously around the longitudinal axis 11 of the tube 10. A plurality of detector coils 30 may be positioned with their axes radial with respect to the tube 10, as in Fig. 1. The coils may be symmetrically disposed around the circumference of the tube 10 in such number as is found desirable to give complete coverage for the tube surface, preferably, also in series aiding relationship. The normal output from the series of coils may be connected to any suitable indicator such as a voltmeter, preferably after being amplified by any suitable thermionic amplifier. Here, too, as the diametric field of flux rotates around the axis 11 due to the successive energization of the stator windings 40, 41 and 42, eddy currents will be induced in the wall of the tube 10 in a plane substantially normal to the direction of flux. These eddy currents will be of constant value normally, and thus will affect all of said coils equally so that the normal output from the coils remains unchanged. If, however, a fissure interrupts the flow of eddy current, this will cause an unbalance in the respective coil adjacent such unbalance, and will change the output.

Figure 3:
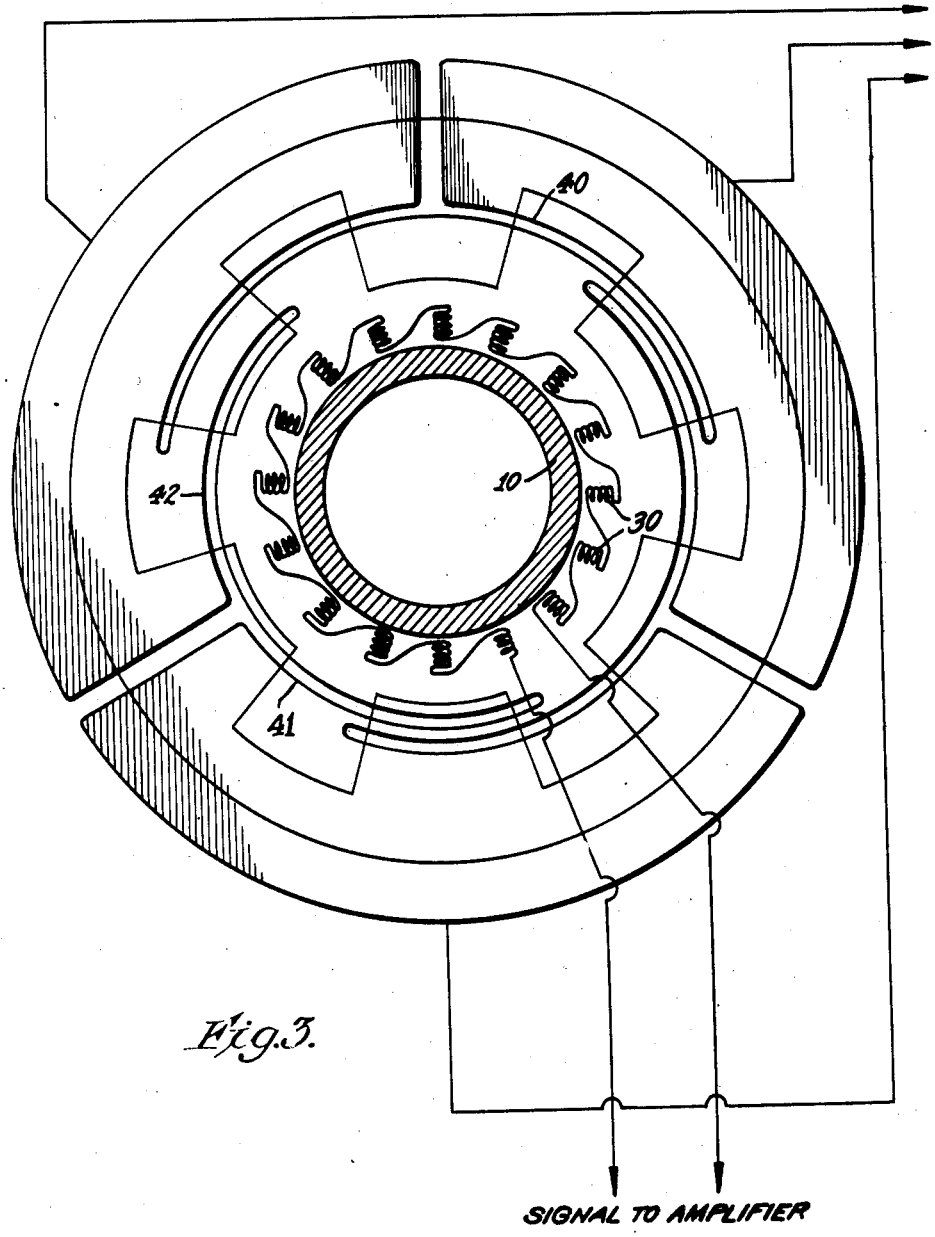
Fig. 3 is a view similar to Fig. 1, but showing a modified form of this invention.
Figure 6:
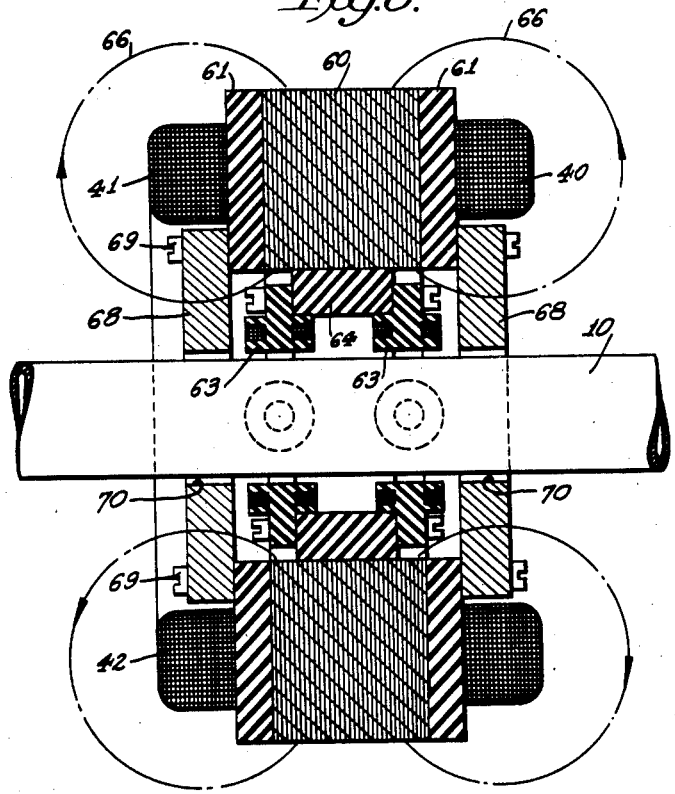
Fig. 6 is a vertical section through a three-phase stator embodying features of this invention.
Figure 7:
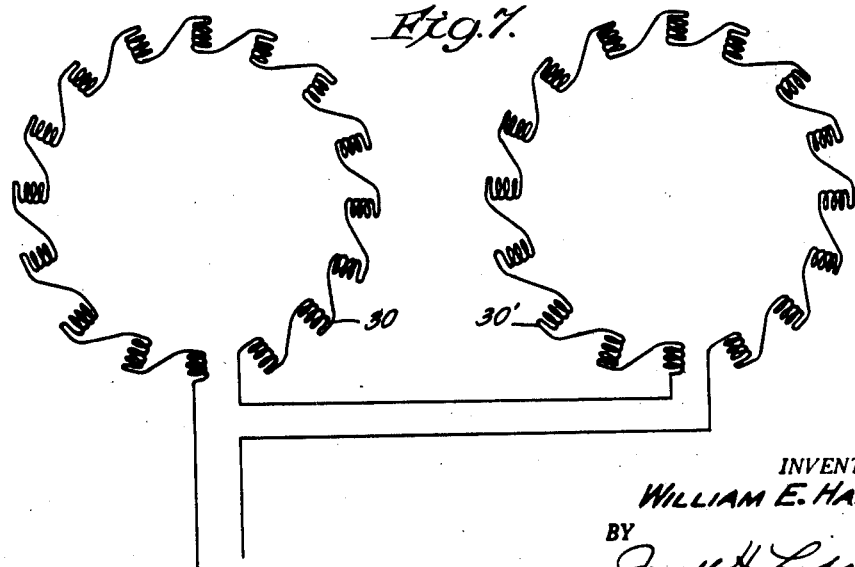
Fig. 7 is a view largely diagrammatic showing the method of connection of the sets of detector coils employed in the Fig. 6 form of the invention.

One form of stator which may be employed in the Fig. 3 form of the invention is disclosed in Fig. 6 wherein the windings 40, 41, 42 are shown wound around a circular laminated core 60 from which it is separated by insulation 61. The series of coils 30 may be mounted on insulated supports 63 carried by the circumferential bracket 64 fixed to the interior surface of the core member 60. In this case it will be seen that two such sets of coils 30 and 30' are shown symmetrically disposed with respect to the center plane of core 60, and surrounding the tube 10 which is being tested. Each set of coils 30 and 30' is connected series aiding, but the two sets are connected in opposition as shown in Fig. 7. As a result of this wiring, it is found that the detector mechanism is much less sensitive to lateral displacements of the tube 10.

A further feature of the stator shown in Fig. 6 consists in means which will prevent the tendency of a certain amount of the flux generated by the windings from leaking circumferentially around the core 60 as shown by the flux lines 66. For this purpose I apply to the side surfaces of the core member, copper discs 68 fixed to the core member 60 by any suitable means such as screws 69 adjacent the inner periphery of the windings, and having an opening 70 only just large enough to permit the tube 10 to pass therethrough. Leakage lines of flux such as lines 66 will generate eddy currents within the copper discs, and said eddy currents will effectively prevent the flow of flux outwardly away from the diametric paths. Thus, a greater concentration of flux along the diametric paths is obtained. Any low resistance metal may be substituted for copper, whereby eddy currents will be generated therein due to leakage flux.

Referring to Fig. 4, there is disclosed another form of my invention wherein the source of energization is supplied from a two-phase system instead of a three-phase system. The operation is similar to that in Fig. 3 which disclosed the three-phase energization, except that the phases are 90° apart instead of 120° apart. The energizing coils are shown mounted on cores, coils 44 being connected to one phase of the two-phase A. C. supply, while coils 45 are connected to the other phase. The pairs of detector coils 46 and 47 also may be mounted on the poles. However, the fact that the phases are 90° apart permits the use of a special type of indicator, namely, a cathode ray oscillograph having pairs of opposed plates, one pair 48 connected to the pair of detector coils 46, while the other pair of plates 49 is connected to the other pair of detector coils 47. When the outputs from the two pairs of detector coils are the same, the oscillograph traces a normal circle 50, as shown in Fig. 5. The outputs of the coils will be the same when there is no defect present in the tube wall, in which case the eddy currents which are generated are uniform throughout the circumference of the tube. When a fissure is present, it will affect one phase more than the other, and the oscillograph will trace a distorted path 51.

In accordance with the provisions of the patent statutes, I have herein described the principle and operation of my invention, together with the apparatus which I now consider to represent the best embodiment thereof, but I desire to have it undestood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws in tubing and the like, which consists in passing flux through the tube substantially along a diameter thereof, moving said flux and said tube relatively to generate circular eddy currents in the tube in a plane substantially normal to said flux, and indicating variations in said eddy currents.

2. The method of detecting flows in tubing and the like, which consists in passing flux through the tube substantially along a diameter thereof, rotating the diametric path of said flux continuously around the longitudinal axis of the tube to generate circular eddy currents in a plane substantially normal to said flux, and indicating variations in said eddy currents.

3. A device for detecting flaws in tubing and the like, said device comprising means for passing flux through said tube substantially along a diameter thereof, means for moving said flux and said tube relatively whereby eddy currents are generated in the tube in a plane substantially normal to said flux, means responsive to said eddy currents, and indicating means actuated by said responsive means.

4. A device for detecting flaws in tubing and the like, said device comprising means for passing flux through said tube substantially along a diameter thereof, means for relatively rotating said flux and said tube continuously around the longitudinal axis of the tube whereby eddy currents are generated in the tube in a plane substantially normal to said flux, means responsive to said eddy currents, and indicating means actuated by said responsive means.

5. A device for detecting flaws in tubing and the like, said device comprising a multi-phase stator having a plurality of pairs of diametrically opposed poles concentrically arranged around said tube and having a plurality of windings on the respective pairs of poles and connected to the respective phases of a multi-phase generator whereby the windings are successively energized to generate eddy currents in the tube in a plane substantially normal to said flux, means positioned close to the portion of the tube being energized and responsive to said eddy currents, and indicating means actuated by said responsive means.

6. A device for detecting flaws in tubing and the like, said device comprising a multi-phase stator having a plurality of pairs of diametrically opposed poles concentrically arranged around said tube and having a plurality of windings on the respective pairs of poles and connected to the respective phases of a multi-phase generator whereby the windings are successively energized to generate eddy currents in the tube in a plane substantially normal to said flux, a plurality of detector coils arranged circumferentially around the tube in the magnetic field close to the portion of the tube being energized and connected in series so as to respond to said eddy currents, and indicating means actuated by the E. M. F. induced in said detector coils.

7. A device for detecting flaws in tubing and the like, said device comprising a three phase stator having a plurality of pairs of diametrically opposed poles concentrically arranged around said tube and having a plurality of windings on the respective pairs of poles and connected to the respective phases of a three-phase generator to generate eddy currents in the tube in a plane substantially normal to said flux, means positioned close to the portion of the tube being energized and responsive to said eddy currents, and indicating means actuated by said responsive means.

8. A device for detecting flaws in tubing and the like, said device comprising a two-phase stator having a plurality of pairs of diametrically opposed poles concentrically arranged around said tube and having a plurality of windings on the respective pairs of poles and connected to the respective phases of a two-phase generator whereby the windings are successively energized to generate eddy currents in the tube in a plane substantially normal to said flux, a plurality of detector coils arranged circumferentially around the tube in the magnetic field close to the portion of the tube being energized and responsive to said eddy currents, alternate detector coils being connected in series, and a cathode ray oscillograph having pairs of plates 90° out of phase, one set of series-connected detector coils being connected to one pair of plates, and the other set of coils being connected to the other pair of plates, the two sets of coils being symmetrically mounted with respect to the field set up by the eddy currents.

9. A device for detecting flaws in tubing and the like, said device comprising a multi-phase stator having a plurality of pairs of diametrically opposed poles concentrically arranged around said tube and having a plurality of windings on the respective pairs of poles and connected to the respective phases of a multi-phase generator whereby the windings are successively energized to generate eddy currents in the tube in a plane substantially normal to said flux, a set of detector coils arranged circumferentially around the tube in the magnetic field close to the portion of the tube being energized and connected in series so as to respond to said eddy currents, a second set of detector coils arranged circumferentially around the tube in the magnetic field close to the portion of the tube being energized and connected in series so as to respond to said eddy currents, said sets being spaced axially along the tube and connected in opposition, the two sets of coils being symmetrically mounted with respect to the field set up by the eddy currents, and indicating means actuated by the E. M. F. induced in said sets of detector coils.

10. A device for detecting flaws in tubing and the like, said device comprising a multi-phase stator having a plurality of pairs of diametrically opposed poles concentrically arranged around said tube and having a plurality of windings on the respective pairs of poles and connected to the respective phases of a multi-phase generator whereby the windings are successively energized to generate eddy currents in the tube in a plane substantially normal to said flux, a set of detector coils arranged circumferentially around the tube in the magnetic field close to the portion of the tube being energized and connected in series so as to respond to said eddy currents, a second set of detector coils arranged circumferentially around the tube in the magnetic field close to the portion of the tube being energized and connected in series so as to respond to said eddy currents, said second set being displaced from said first set along the longitudinal axis of the tube, said sets being connected in opposition, the two sets of coils being symmetrically mounted with respect to the field set up by the eddy currents, and indicating means actuated by the E. M. F. induced in said sets of detector coils.

11. A device for detecting flaws in tubing and the like, said device comprising a multi-phase stator comprising a core having poles and an opening through which the tube is adapted to pass, and a plurality of windings wound around said core, said core and said windings being arranged to pass flux through the tube diametrically thereof, said windings being connected to the respective phases of a multi-phase generator whereby said windings are energized in succession to generate eddy currents in the tube in a plane substantially normal to said flux, means positioned close to the portion of the tube being energized and responsive to said eddy currents, indicating means actuated by said responsive means, and means for preventing flux from said windings leaking away from the diametric path, said last-named means including low resistance metallic members being spaced longitudinally from the responsive means and in which said leakage flux will generate eddy currents, said members being positioned so as substantially to close the openings between the core and the tube.

12. A device for detecting flaws in tubing and the like, said device comprising a multi-phase stator comprising a core having poles and an opening through which the tube is adapted to pass, and a plurality of windings wound around said core, said core and said windings being arranged to pass flux through the tube diametrically thereof, said windings being connected to the respective phases of a multi-phase generator whereby said windings are energized in succession to generate eddy currents in the tube in a plane substantially normal to said flux, means positioned close to the portion of the tube being energized and responsive to said eddy currents, indicating means actuated by said responsive means, and means for preventing flux from said windings leaking away from the diametric path, said last-named means including copper discs spaced longitudinally from the responsive means and substantially closing the openings between the core and the tube.

WILLIAM E. HABIG.

REFERENCES CITED

The following references are of record in the file of this patent:

UNITED STATES PATENTS

| Number | Name | Date |
| --- | --- | --- |
| 1,599,645 | Burrows | Sept. 14, 1926 |
| 2,065,379 | Knerr et al. | Dec. 22, 1936 |
| 2,124,579 | Knerr et al. | July 25, 1938 |
| 2,162,710 | Gunn | June 20, 1939 |
| 2,255,053 | Gunn | Sept. 9, 1941 |

OTHER REFERENCES

Gunn, Journal of Applied Mechanics (Trans. A. S. M. E.), March 1941 (p. A.-22 to A-26).